T. A. WILLARD.
APPARATUS FOR SEALING STORAGE BATTERY JARS.
APPLICATION FILED FEB. 28, 1920.
1,391,149.
Patented Sept. 20, 1921.
2 SHEETS—SHEET 1.
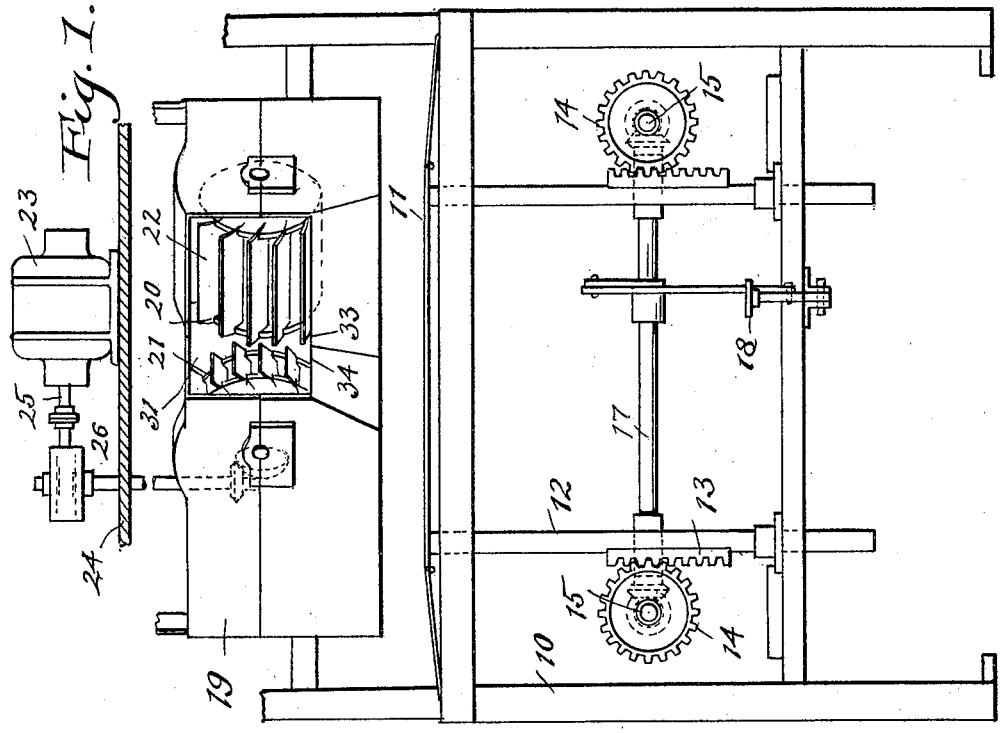
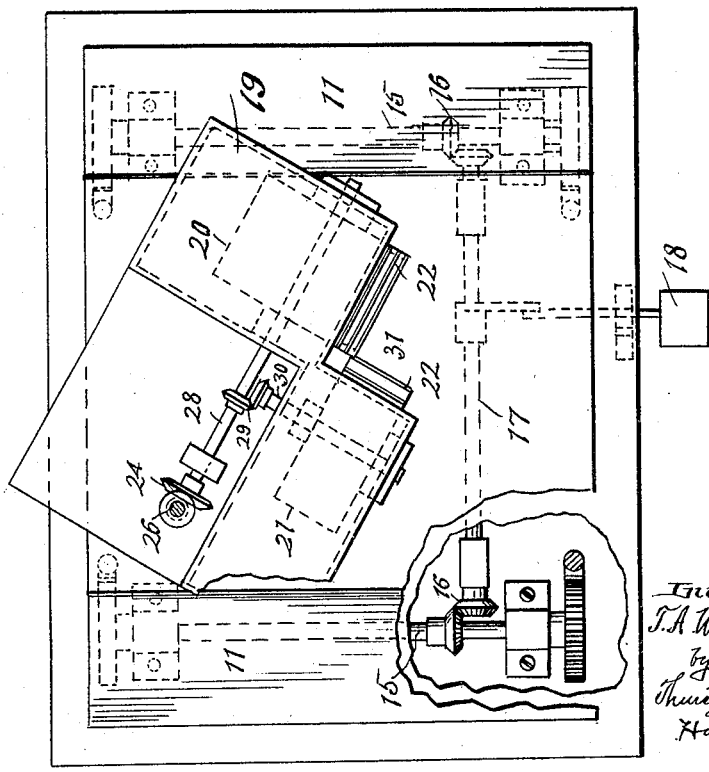

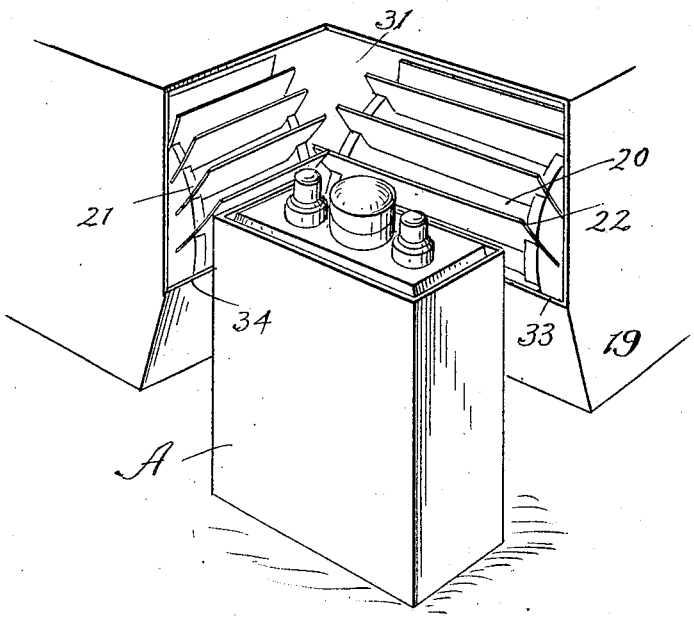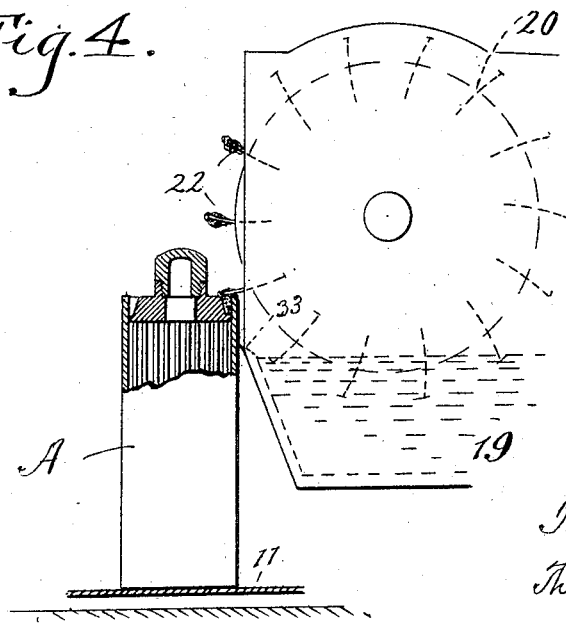

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

APPARATUS FOR SEALING STORAGE-BATTERY JARS.

1,391,149. Specification of Letters Patent. Patented Sept. 20, 1921.

Application filed February 28, 1920. Serial No. 362,147.

*To all whom it may concern:*

Be it known that I, THEODORE A. WILLARD, a citizen of the United States, residing at Cleveland Heights, in the county of Cuyahoga and State of Ohio, have invented a certain new and useful Improvement in Apparatus for Sealing Storage-Battery Jars, of which the following is a full, clear, and exact description.

This invention relates to a machine for sealing storage battery jars.

In making storage batteries each cell of a battery generally includes a jar with a cover that fits down inside the jar, and is sealed in the top of the jar by sealing compound which is inserted by hand between the sides of the jar and a marginal depression of the jar cover. The hand sealing consumes time and is a very disagreeable task, inasmuch as the sealing compound is usually a viscous, sticky, pitch-like material which is not easily handled and applied.

The object of the present invention is to provide a machine which will apply the compound quickly and accurately without requiring that the operator handle anything but the jars. This is accomplished by the provision of a machine with wiper-like members which can be given a continuous movement, such as a rotary movement, and against which the operator has simply to place the jar to have the sealing compound applied in the desired manner. Preferably two rotary wipers are employed at right angles to each other, and arranged so that two sides of the jar will be sealed simultaneously.

The invention may be further briefly summarized as consisting in certain novel details of construction, and combinations and arrangements of parts which will be described in the specification and set forth in the appended claims.

In the accompanying sheet of drawings, Figure 1 is a side view of the machine with parts in section, showing the sealing apparatus, including an adjustable table on which the jars are supported while receiving the sealing compound; Fig. 2 is a top plan view of the same with a driving motor and support removed; and Figs. 3 and 4 are enlarged perspective and side views illustrating the manner in which the sealing compound is applied to the jars.

In the drawings, 10 represents a frame provided with a vertically adjustable horizontal table 11 on which the jars A are placed while being sealed, the table being made adjustable in order that the machine may accommodate jars of various heights since the compound applying apparatus is preferably supported in fixed position above the table. Preferably, the table 11 is supported and moved vertically by a series of vertical standards 12 having racks 13 which are engaged by elevating and lowering gears 14 on two horizontal shafts 15 which are turned in one direction or the other by bevel gearing 16 on a front cross shaft 17 adapted to be turned by pedal mechanism 18. By moving the pedal the operator can raise or lower the table, though ordinarily the table will be stationary, for generally a large series of jars of uniform height will be supplied to the machine.

Supported above the table and preferably by the same frame-work that supports the table is a receptacle 19 containing the sealing compound, and the compound applying mechanism. In this instance the compound is applied by two wheels 20 and 21 with flexible outstanding blades or wipers 22 which, when the wheels are rotated, dip down into the compound and wipe or scrape the compound against the top edges of the jars in the manner illustrated in Figs. 3 and 4. The two wheels 20, 21, are supported at right angles to each other as shown, in bearings carried by the receptacle 19.

Any suitable means may be provided for rotating the compound applying wheels, but in this instance an electric motor 23 is utilized, this motor being supported on a platform 24 which is above the receptacle and also is preferably supported by the frame work 10. The motor shaft 25 is connected by gearing to a vertical shaft 26 which extends down into the receptacle and is connected by bevel gearing 27 (see Fig. 2) to the shaft 28 of wheel 20, and this shaft 28 is connected by bevel gearing 29 to the shaft 30 of wheel 21. In this manner both wheels 20, 21, are driven at the same speed which can be varied to obtain the desired results.

It will be observed that there is a rectangular recess 31 in one corner of the receptacle to accommodate the jars to be sealed when supported on the table 11 beneath, and that the blades 22 project out through an opening 32 of the receptacle, as clearly shown in Fig. 1. Beneath this opening the lower closed part of the receptacle is formed with two edges 33 and 34 which are at right angles to each other, and against which two adjacent sides of the jar are placed during the sealing operation. Beneath these edges 33, 34, the receptacle slopes inwardly so that the jar will bear against said edges 33, 34 only when in position for receiving sealing compound.

The blades 22 are formed of flexible material, and the corners of the blades on one wheel slightly overlap the corners of the blades of the other wheel, so that the compound will be applied completely around two sides of the jar at the same time. It will be observed also by reference to Fig. 1, that the blades of the two wheels do not engage each other but the adjacent corners interfit, so to speak, and alternately engage the top edge of the jar.

Inasmuch as a storage battery jar is usually rectangular in cross section, the two opposite sides being longer than the other two, one wheel and its blades are made longer than the other wheel and its blades, the length of both wheels being such that the jars of the largest as well as the smallest sizes can be accommodated.

When the machine is in operation, compound is in the receptacle, and is preferably heated in any suitable way, but preferably by electric heating elements in the bottom of the receptacle, so that the compound will be of the proper fluidity. Enough compound is in the receptacle that as the wheels are rotated the blades dip down into the compound and receive a layer or coating thereof, and if no jars are being sealed, the compound is simply carried around and back into the receptacle.

To seal a jar the operator places a jar on the table 11 against the right angle edges 33, 34, of the receptacle, the table being then at a height such that the blades wipe over two of the top edges of the jar, scraping compound into and filling the recesses along two sides of the jar cover. Then the operator turns the jar around so that the other two sides receive the sealing compound. This is done very quickly, the operator simply inserting the jar into the angle or corner, and quickly reversing it, and then removing it and repeating the operation with succeeding jars, the wiping action of one or two blades being usually sufficient to apply the right amount of sealing compound. If he finds that too much or too little compound is being applied for the interval of time that he wishes to leave the jar in sealing position, the operator has simply to lower or elevate the table to decrease or increase the area of the blades which is wiped over the top edges of the jar.

The apparatus here shown, can be varied in many respects without materially affecting its operation, as for example, in the mechanism for elevating the table, for mounting and driving the rotary compound applying devices, and even in the form and design of the latter, though I prefer to have the compound applied by flexible wipers carried by wheels or equivalent rotary members substantially as shown. Further, the use of the two rotary wipers at right angles to each other is not essential, but is preferably to decrease the time for sealing a jar.

Having described my invention, I claim:

1. In an apparatus for sealing storage battery jars, a receptacle adapted to be provided with sealing compound, and adjacent which a jar to be sealed is adapted to be placed, and means in the receptacle for wiping over the top edge of the jar when supported in a predetermined position with respect to the receptacle so as to deposit a sufficient amount of sealing compound for sealing purposes.

2. In a machine for sealing storage battery jars, a receptacle adapted to be provided with sealing compound, and a rotary compound applying device in the receptacle and adapted to wipe over the top edge of the jar when the latter is placed in a predetermined position adjacent the receptacle, and serving to deposit on the inner side of the top edge of the jar a sufficient amount of the compound for sealing purposes.

3. In an apparatus for sealing storage battery jars, a receptacle adapted to be provided with sealing compound and having an opening, a traveling compound applying device in the receptacle having a portion projecting from said opening so that it will wipe over the top edge of a jar when placed in a predetermined position adjacent the opening of the receptacle, and serving to deposit inside the top edge of the jar a sufficient amount of the compound for sealing purposes.

4. In an apparatus for sealing storage battery jars, a receptacle adapted to be provided with sealing compound, a compound applying device comprising a movable member provided with flexible wipers adapted to dip into the compound and to wipe over the top edge of a jar when placed in a predetermined position with reference to the receptacle, and serving to deposit inside the top edge of the jar a sufficient amount of the compound for sealing purposes.

5. In an apparatus for sealing storage battery jars, a receptacle adapted to be provided with sealing compound, and a rotary wiper having peripheral wiping blades adapted to dip down into the compound and to wipe over the top edge of the jar when placed in a predetermined position with respect to the receptacle, and serving to deposit inside the top edge of the jar a sufficient amount of the compound for sealing purposes.

6. In an apparatus for sealing storage battery jars, a receptacle adapted to be provided with compound, two movable compound applying devices arranged at substantially right angles to each other and adapted to wipe over two adjacent edges of a jar when placed in a predetermined position with respect to the receptacle.

7. In an apparatus for sealing storage battery jars, a receptacle adapted to be provided with sealing compound, and two rotary compound applying devices arranged at substantially right angles to each other and adapted to dip down into the compound and to wipe over two adjacent top edges of a jar when placed in a predetermined position with respect to the receptacle.

8. In an apparatus for sealing storage battery jars, a receptacle adapted to be provided with sealing compound, and a pair of rotary compound applying devices provided with peripheral wipers adapted to dip down into the compound and to wipe over two adjacent top edges of the jar when the latter is placed in a predetermined position with respect to the receptacle.

9. In an apparatus for sealing storage battery jars, a receptacle having a right angular notch and adapted to accommodate a jar to be sealed, and having a pair of rotary wipers which are adapted to dip down into compound contained in the receptacle and to wipe over two adjacent top edges of a jar placed in the notch of the receptacle.

10. In an apparatus for sealing storage battery jars, a receptacle adapted to be provided with sealing compound and provided with a rectangular notch and an opening, and a pair of rotary wipers having peripheral compound applying devices, said wipers being arranged at substantially right angles to each other and mounted so that the compound applying devices project through said opening and will wipe over two adjacent top edges of a jar placed in said notch.

11. In an apparatus for sealing storage battery jars, a receptacle adapted to be provided with sealing compound, and adjacent which a jar to be sealed is adapted to be placed, movable means in the receptacle adapted to engage the top edge of the jar to apply sealing compound thereto, and a table on which the jar is adapted to be supported, the jar and receptacle being relatively adjustable.

12. In an apparatus for sealing storage battery jars, a receptacle adapted to be provided with sealing compound, and adjacent which a jar to be sealed is adapted to be placed, movable means in the receptacle adapted to engage the top edge of the jar to apply sealing compound thereto, a table beneath the receptacle on which the jar is supported while being sealed, and means for adjusting the table toward and from the receptacle.

13. In an apparatus for sealing storage battery jars, a receptacle adapted to contain jar sealing compound, movable means in the receptacle adapted to engage the top edge of a jar so as to apply sealing compound thereto, and a stationary abutment against which the jar is adapted to be placed with its top edge at a predetermined elevation with respect to the movable means.

In testimony whereof, I hereunto affix my signature.

THEODORE A. WILLARD.